US009297181B2

(12) United States Patent
Gasparetto

(10) Patent No.: US 9,297,181 B2
(45) Date of Patent: Mar. 29, 2016

(54) ARC PROOF DOOR ASSEMBLY

(76) Inventor: Mario Gasparetto, Toronto (CA)

( * ) Notice: Subject to any disclaimer, the term of this patent is extended or adjusted under 35 U.S.C. 154(b) by 321 days.

(21) Appl. No.: 13/467,273

(22) Filed: May 9, 2012

(65) Prior Publication Data
US 2013/0298468 A1 Nov. 14, 2013

Related U.S. Application Data

(60) Provisional application No. 61/484,820, filed on May 11, 2011.

(51) Int. Cl.
E05C 9/00 (2006.01)
E05B 1/00 (2006.01)
E05C 9/04 (2006.01)
E05C 9/02 (2006.01)
E05B 65/06 (2006.01)
E05C 1/00 (2006.01)

(52) U.S. Cl.
CPC . E05B 1/00 (2013.01); E05B 65/06 (2013.01); E05C 9/025 (2013.01); E05C 9/042 (2013.01)

(58) Field of Classification Search
CPC ............ E05C 9/00; E05C 9/008; E05C 9/02; E05C 9/025; E05C 9/04; E05C 9/042
USPC .............. 292/32–34, 36–38, 40, 42, DIG. 11, 292/DIG. 68, DIG. 69
See application file for complete search history.

(56) References Cited

U.S. PATENT DOCUMENTS

| 37,849 | A | * | 3/1863 | Becker | 292/48 |
|---|---|---|---|---|---|
| 1,438,547 | A | * | 12/1922 | O'Connor | 292/161 |
| 1,490,321 | A | * | 4/1924 | Hochreiner | 292/33 |
| 1,515,612 | A | * | 11/1924 | O'Connor | 292/335 |
| 1,671,328 | A | * | 5/1928 | Sturm et al. | 292/162 |
| 2,033,806 | A | * | 3/1936 | Baker et al. | 292/33 |
| 2,460,961 | A | * | 2/1949 | Wilson | 292/48 |
| 2,498,508 | A | * | 2/1950 | Rudolph | 292/31 |
| 2,518,141 | A | * | 8/1950 | Hiler | 70/79 |
| 2,740,284 | A | * | 4/1956 | Gray | 70/79 |
| 3,158,016 | A | * | 11/1964 | Fay | 70/82 |
| 3,175,873 | A | * | 3/1965 | Blomquist et al. | 312/296 |
| 3,367,698 | A | * | 2/1968 | Walker, Sr. | 292/188 |
| 3,400,562 | A | * | 9/1968 | Bloss | 70/70 |
| 3,722,236 | A | * | 3/1973 | Zelenko | 70/78 |
| 3,808,509 | A | * | 4/1974 | Frazier | 361/641 |
| 4,500,122 | A | * | 2/1985 | Douglas | 292/161 |
| 4,807,914 | A | * | 2/1989 | Fleming et al. | 292/48 |
| 4,844,565 | A | * | 7/1989 | Brafford et al. | 312/107.5 |
| 4,864,466 | A | * | 9/1989 | Gasparetto | 361/605 |
| 5,209,168 | A | * | 5/1993 | Chapron et al. | 109/59 T |
| 5,333,920 | A | * | 8/1994 | de Rover | 292/48 |
| 5,542,720 | A | * | 8/1996 | Fleming | 292/32 |
| 6,637,784 | B1 | * | 10/2003 | Hauber et al. | 292/300 |
| 6,971,322 | B2 | * | 12/2005 | DuBois et al. | 109/24.1 |
| 7,871,137 | B2 | * | 1/2011 | Schulz et al. | 312/296 |
| 8,733,853 | B2 | * | 5/2014 | Gingrich | 312/216 |

* cited by examiner

Primary Examiner — Carlos Lugo
(74) Attorney, Agent, or Firm — Elias Borges

(57) ABSTRACT

There is disclosed a door assembly for use on an electric switch housing which is virtually arc proof. The door assembly includes a rectangular frame with a door pivotally connected to one side of the frame by an elongated piano type hinge. A multi-latch door lock secures the door to the frame by providing a plurality of locking latch points along three sides of the door and door frame. The multi-latch door lock is operated from a single handle to operate the lock between its locked and unlocked conditions. A fail safe mechanism is provided to automatically cut off the flow of current in the electric switch when the door is opened.

9 Claims, 4 Drawing Sheets

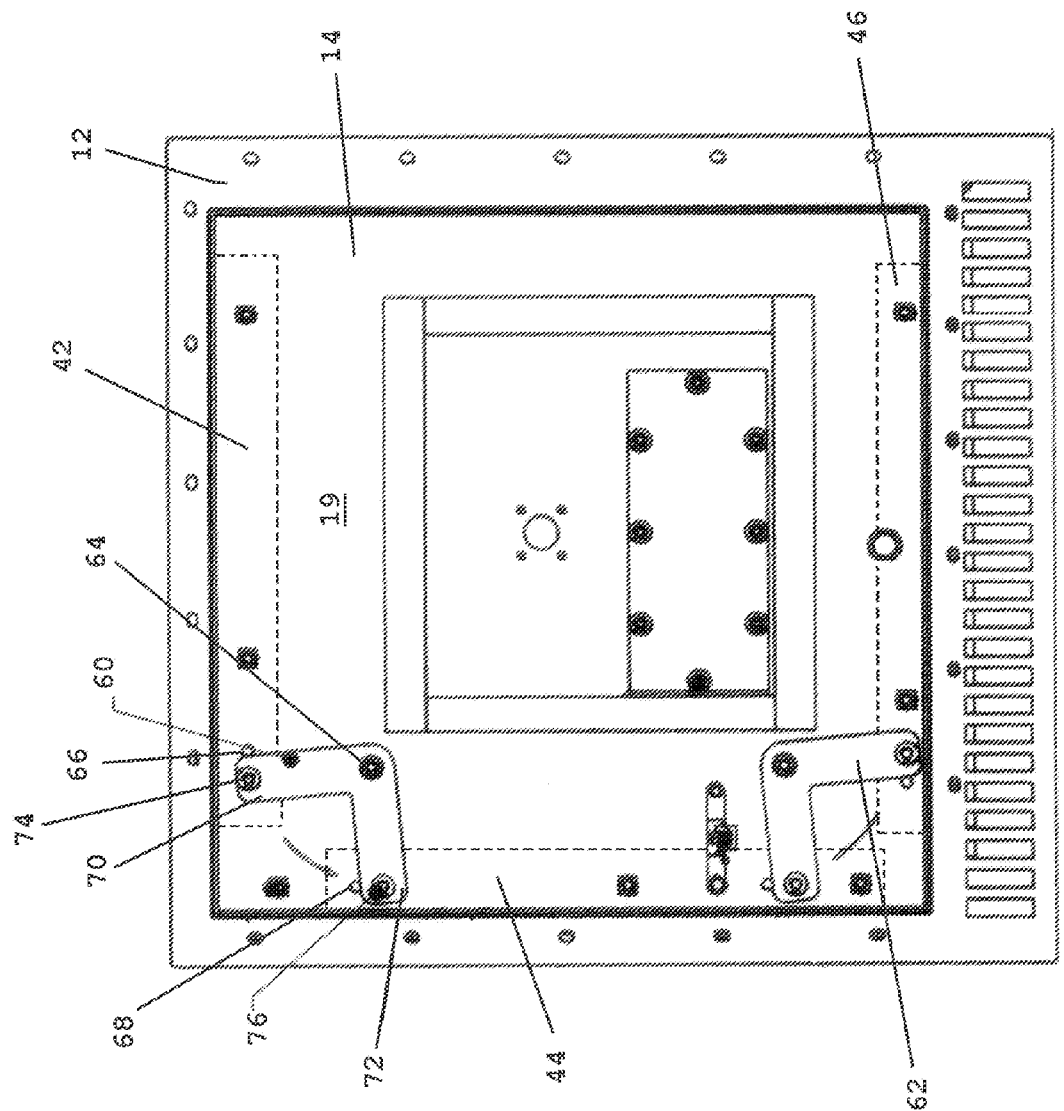
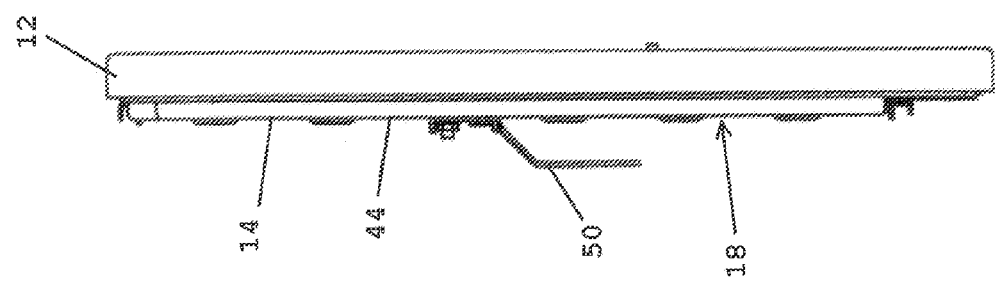
Fig. 4
Fig. 3

ARC PROOF DOOR ASSEMBLY

CROSS REFERENCE TO RELATED APPLICATION

This application claims priority from U.S. provisional patent application No. 61/484,820 filed May 11, 2011, the entirety of which is incorporated herein by reference.

FIELD OF THE INVENTION

The invention relates generally to door assemblies for use with high voltage electric switches.

BACKGROUND OF THE INVENTION

Medium voltage interrupting devices (circuit breakers, switches, fuses) and associated equipment (instrument transformers, bus bars, L.A., etc) are contained in switchgear housings which consist of a large steel box divided in separate compartments. Lockable arc-resistant doors are provided in front of the medium voltage compartments. The arc-resistant doors are designed and tested to provide the highest possible degree of protection to personnel standing in front of the doors against the effects of an short circuit arc occurring in atmospheric air within the medium voltage compartment.

The short circuit current can reach values of thousands of amperes and the can cause a powerful explosion which can blow of the doors, eject outside hot gases and particles that can injure or kill personnel close to the switchgear enclosure.

To prevent injuries the switchgear enclosures are made as arc-proof as possible. The door accessing the medium voltage compartment is the point of weakness. To overcome the possibility of short circuit by-products escaping through the door of the switchgear housing, the door is made of thick steel and usually bolted closed by a plurality of bolts along the periphery of the door. While this is effective in closing off the door and securing it from a high short circuit arc, it makes accessing the inside of the compartment very difficult since a great deal of time will be required to unbolt the door to open it.

Ordinary door locks as used on standard or high security doors are much more convenient to use. These doors' locking system generally comprise a handle portion which is coupled to one or more door latches which engage one or more corresponding keepers in the door frame. Turning or moving the door handle generally causes the latch, or latches, to disengage their respective keepers, unlocking the door and allowing the user to open the door. While this standard type of door lock is quit convenient to use, it is generally not suitable for use with medium voltage switchgear enclosures. Standard door locks of this type do not provide the security required by high current short circuits arcs up to 63 kA, and will generally result in the door being blown off the housing in the event of a high current arc. An improved door assembly but which is as secure and arc-proof as a bolted door is therefore required.

SUMMARY OF THE INVENTION

In accordance with one aspect of the present invention, there is provided an arc proof door assemble for use with medium voltage equipment contained within a switchgear enclosure. The door is designed and tested to withstand the transient pressure and the thermal effects of an internal arcing fault and remain closed and latched. The multi point latching elements on three sides of the door periphery are moved between locked and un-locked position by a rotary handle (180 degree rotation). On the fourth side of the door, there is a piano continuous steel hinge (⅜" diameter pin, and ⅛" steel flaps). The operating handle has a cam that when rotated moves the locking elements 1.25" between closed and locked positions.

The door assembly includes a frame having opposite first and second sides, opposite third and fourth sides and a central opening, each side of the frame having a length. A door is provided which is dimensioned and configured to close off the central opening, the door having opposite first and second sides and opposite third and fourth sides, the first side of the door being hinged to the first side of the frame, the door having an inside surface facing towards the opening and an outside surface facing away from the opening, each side of the door having a length. The door assembly further includes a lock mechanism for releasably locking the door when the door is in a closed position, the lock mechanism including first, second and third elongated movable lock members extending along the lengths of the second, third and fourth sides of the door, respectively, said first, second and third elongated movable lock members engaging corresponding first, second and third stationary lock members extending along the lengths of the second, third and fourth sides of the frame, respectively, the first, second and third movable lock members each being movable between a locked position wherein the movable lock member locks with its respective stationary lock member, and an unlocked position wherein the movable lock member disengages from is respective stationary lock member. The lock mechanism further includes first and second link arms movably mounted to the door, the first link arm coupling the first and second movable lock members together and the second link arm coupling the second and third movable lock members together, the link arms and movable lock members being configured such that moving one of the movable lock members between its locked and unlocked positions causes the remaining movable lock arms to move between their locked and unlocked positions simultaneously. Finally, the door assembly includes a handle mounted to the outside surface of the door, the handle being operatively coupled to one of the movable lock members to enable a user to move the movable lock member between its locked and unlocked position.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

FIG. 3 is a side view of the door assembly shown in FIG. 2.

FIG. 4 is a back view of the door assembly shown in FIG. 2 showing the back side of the door portion.

In the drawings like characters of reference indicate corresponding parts in the different figures.

DETAILED DESCRIPTION OF THE INVENTION

Figure 1:
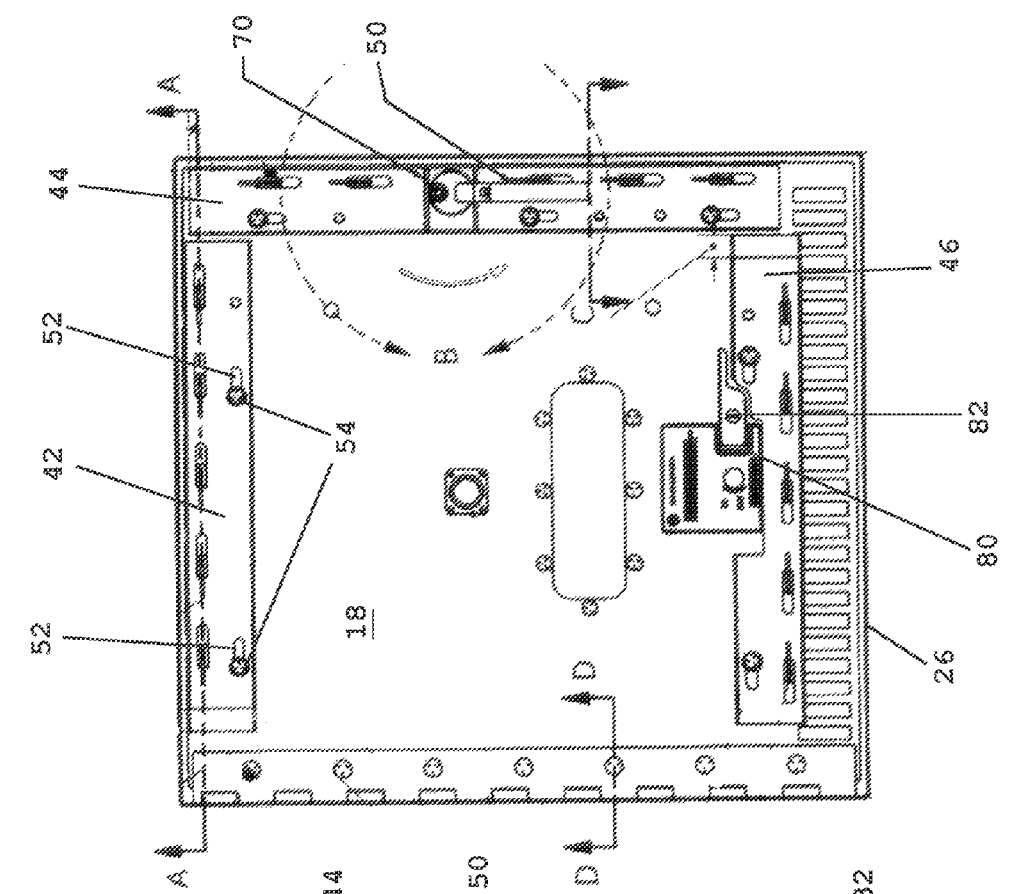
FIG. 1 is a perspective view of a door assembly made in accordance with the present invention with the door in its open position.
Figure 2:
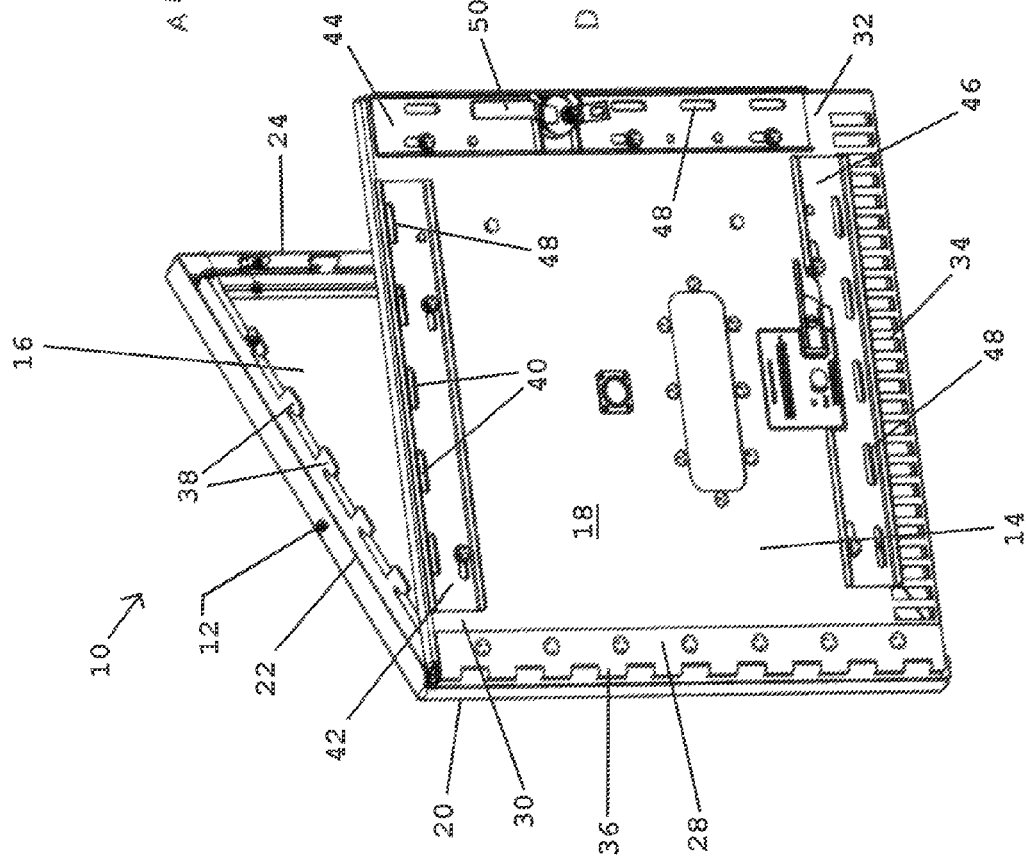
FIG. 2 is a front view of the outside of the door assembly made in accordance with the present invention with the door in its closed position.

Referring to FIGS. 1 and 2, an arc proof door assembly made in accordance with the present invention is shown generally as item 10 and includes door frame 12 and a door 14 pivotally connected to the door frame. Door frame 12 has an opening 16 and door 14 is dimensioned to close off opening 16 when the door is in its closed position as shown in FIG. 2. Door frame 12 has opposite sides 20 and 24 and opposite sides 22 and 26. Likewise, door 14 has opposite sides 28 and 32 and opposite sides 30 and 34. Side 28 of door 14 is pivotally connected to side 20 of door frame 12 by elongated piano type hinge 36 which extends along the entire length of sides 20 and 28 permitting the door to swing freely between its open position as shown in FIG. 1 to its closed position shown in FIG. 2. In order to ensure that the door remains securely hinged to the frame during a high energy arc, hinge 36 must be quite robust. It has been discovered that if hinge 36 has a ⅜ inch pin and ⅛ inch steel flaps, then it will be sufficiently robust to withstand a high energy arc and ensure that the hinge keeps the door secure to the frame.

Door 14 can be releasably locked to door frame 12 by means of a plurality of movable locking elements positioned along the periphery of door 14 which couple to corresponding stationary locking elements positioned along the frame. In particular, each of sides 22, 24 and 26 of frame 12 is provided with an elongated row of hooked fingers 38 which are dimensioned to pass through apertures 40 on door 14 which are formed in an elongated row along the edges of sides 30, 32 and 34. Hooked fingers 38 form a row of stationary locking elements which extend along the lengths of sides 22, 24 and 26 of the frame. Apertures 40 are positioned in elongated rows along sides 30, 32 and 34 such that the apertures receive fingers 38 when door 14 is placed in its closed position and the fingers project from outside surface 18 of the door. Movable lock members 42, 44 and 46 are provided on sides 30, 32 and 34 of door 14, respectively.

Each of the movable lock members are slidingly mounted to outside surface 18 of door 14 by means of bolts 54 mounted within elongated slots 52. Each of the movable lock members have a row of openings 48 which are dimensioned and configured to receive hooked fingers 38. Each movable lock member is movable between an unlocked position as shown in FIG. 1 and a locked position as shown in FIG. 2. When the movable lock members are in their unlocked position, each aperture 48 in the movable lock member is coaxially aligned with aperture 40 in the underlying portion of door 14 to enable hooked fingers 38 to pass through both apertures 40 and apertures 48 without the hooked fingers engaging the movable lock member. When movable lock members 42, 44 and 46 are in their unlocked position, it is possible to close door 14 to completely close off opening 16 since fingers 38 will pass through apertures 40 and 48 and sides 22, 24 and 26 of frame 12 can closely abut sides 30, 32 and 34 of door 14. When the door is in its closed position, movable lock members 42, 44 and 46 can then be moved from their unlocked position to their locked position simply by sliding them.

Figure 5:
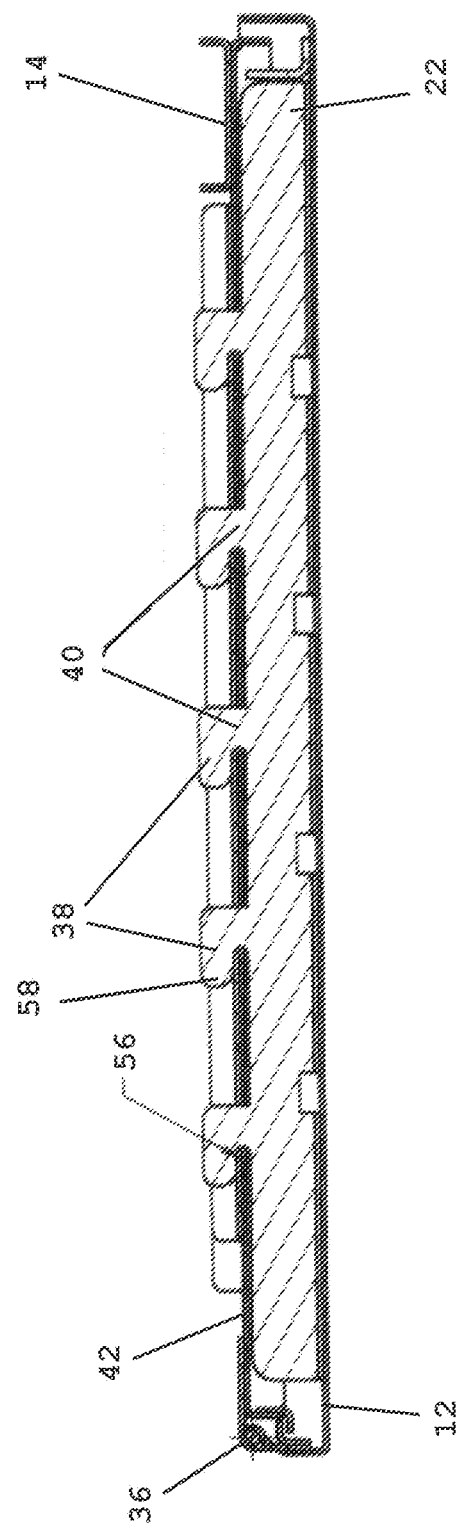
FIG. 5 is a cross sectional view taken along line A-A of FIG. 2.

Referring now to FIG. 5, the operation of each of the movable lock members will now be discussed with reference to movable lock member 42. It will be appreciated that each of the movable lock members operates in the same way. When the movable lock members are moved into their locked position when door 14 is closed, the movable lock members are positioned such that they engage hooked fingers 38. In particular, when the movable lock member (in this case item 42) is placed in its locked position, edges 56 of the movable lock member are positioned underneath hook 58 of hooked fingers 38. Side 22 of frame 12 is thereby locked onto door 14 by the positioning of the movable lock member 42 which prevents the door from being opened by partially obscuring aperture 40 preventing hooked portion 58 from passing through the aperture. Hooked fingers 38 on side 22 of frame 12 and movable lock member 42 act as a multi-latch lock providing many locking points along the length of side 22. This makes for a very strong and secure lock.

Referring now to FIGS. 3 and 4, it is important that all of the movable lock members move between their locked and unlocked positions simultaneously to allow for the proper operation of the door lock. Each of the movable lock members are linked to its adjacent movable lock member by a link arm which permits all three movable members to move together when one of the movable lock members is moved. Handle portion 50 is mounted to movable lock member 44 and projects from outside surface 18 of door 14 to enable a user to grasp the handle portion and move lock member 44. Movable lock member 44 is coupled to movable lock members 42 and 46 by pivoting link arms 60 and 62, respectively. Link arm 60 is pivotally mounted to inside surface 19 of door 14 by pivotal connection 64. Link arms 60 is an "L" shaped members having two arms joined at an apex, the link arm being pivotally connected to the door at the link arm's apex. Link arm 60 is pivotally connected to a different movable lock member at the end of each arm through slots 66 and 68. End 70 of link arm 60 is pivotally coupled to movable lock member 42 on the other side of door 14 via link bolt 74 passing through slot 66. Likewise, end 72 of link arm 60 is pivotally coupled to movable lock member 44 via link bolt 76 passing through slot 68. Moving movable lock member 44 causes a corresponding movement in link arm 60 which in turn causes movable lock member 42 to move by the same distance in a perpendicular direction to lock member 44. Movable lock member 44 is coupled to movable lock member 46 via pivoting link arm 62 in an identical fashion as with link arm 60. Hence, all three movable lock members are coupled together by link arms 60 and 62 such that moving one movable lock member causes a simultaneous perpendicular movement of the other two link arms.

Referring back to FIGS. 1 and 2, handle portion 50 is movable between a locked position as seen in FIG. 2 and an unlocked position as shown in FIG. 1. Lock 70 is configured to lock handle 50 to door 14 when the handle is in its locked position and when movable lock member 44 is in its locked position. Lock 70 is configured such that when the lock is engaged, handle 50 cannot be moved and; therefore, movable lock member 44 cannot be moved and door 14 cannot be opened. Lock 70 can take the form of any suitable key operated lock, even a padlock.

Figure 6:
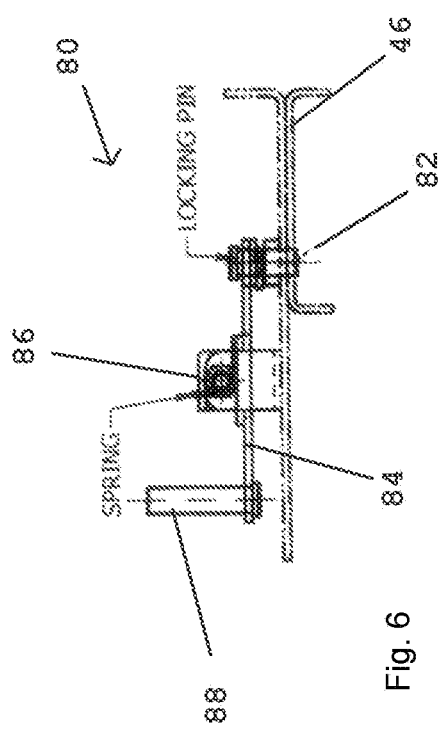
FIG. 6 is a cross sectional view of the interlock fail safe portion of the present invention in its locked state.
Figure 7:
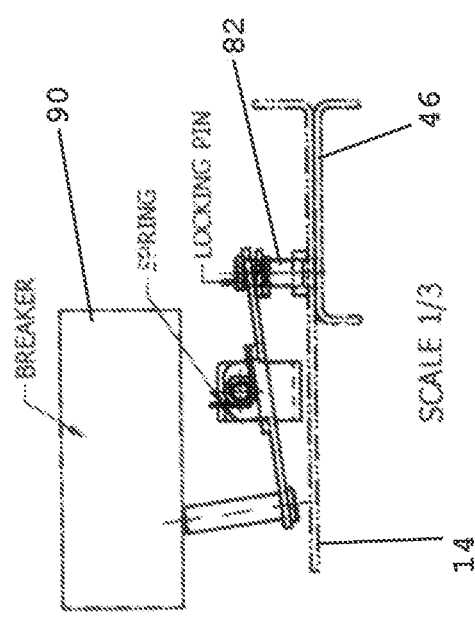
FIG. 7 is a cross sectional view of the interlock fail safe portion of the present invention in its unlocked state.

Referring now to FIGS. 6 and 7, the door assembly is provided with a failsafe mechanism which ensures that the switch housed inside the switch housing is opened and current shut off when door 14 is opened. The interlock failsafe mechanism 80 includes a pivot arm 84 mounted to the inside surface of door 14 with a biasing spring 86 in the middle. One end of arm 84 is mounted to a locking pin 82 which is dimensioned and configured to pass through an aperture passing through door 14 and movable lock member 46. The opposite end of arm 84 is provided with member 88 which is configured to couple to breaker 90 which operates the electric switch (not shown). When the arm is placed in its locked position as shown in FIG. 6, locking pin 82 prevents movable lock member 46 from moving into its unlocked position, thereby preventing door 14 from being opened. Spring 86 biases arm 84 towards its locked position. When locking pin 82 is unlocked and pushed inwardly the arm is placed in its unlocked position (see FIG. 7) and movable lock member 46 is free to move into its unlocked position, permitting the door to be opened. When arm 84 is positioned into its unlocked position, member 88 engages breaker 90 to shut the current off. In this way, it is not possible to open door 14 while current is flowing. Locking pin 82 is preferably a lockable pin which can be locked in the position shown in FIG. 6 by means of a key (not shown). Suitable locking pins are available on the market which can be used.

The present invention has several advantages over the prior art. In particular, the elongated multi-latch lock formed along the edges of the door forms a very secure and strong means of securing the door closed. All sides of the door are secured directly to the door frame by a multi-point attachment mechanism; namely, a piano lock in the case of side 28 and a multi latch lock in the case of sides 30, 32 and 34. Since all sides of the door are secured to the frame directly, door 14 is as secure to frame 12 as if it were mounted by a plurality of bolts. However, since all movable lock members are coupled to a single handle, it is possible to unlock the door by simply moving one handle. This makes it quick and easy to unlock and open the door while at the same time providing a door which is very secure.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

Therefore, what is claimed is:

1. A door assembly for use with an electric switch contained within a switch housing, the door assembly comprising:
    a rectangular frame having first, second, third and fourth sides surround a central opening;
    a rectangular door dimensioned and configured to close off the central opening, the door having first, second, third and fourth sides, the first side of the door being pivotally connected to the first side of the frame by an elongated piano hinge, the door having an inside surface towards the opening and an outside surface away from the opening;
    a first, second and third row of hooked fingers projecting from the second, third and fourth sides of the frame, respectively, the hooked fingers in the first, second and third row of hooked fingers being spaced substantially equidistantly along the first, second and third sides of the frame, respectively, such that each side of the frame has a plurality of hooked fingers projecting there from;
    a first, second and third row of apertures positioned along the second, third and fourth sides of the door, respectively, said first, second and third row of apertures being dimensioned and configured to receive the first, second and third row of hooked fingers, the door being pivotally movable between opened and closed positions, the apertures in the first, second and third row of apertures being aligned with the first, second and third row of hooked fingers such that said hooked fingers project through said apertures when the door is in its closed position;
    first, second and third elongated lock members slidingly mounted on the outside surface of the door adjacent the first, second and third row of apertures, each of the lock members being coupled to each other via a plurality of link members configured to move all three lock members simultaneously between a locked position wherein the first, second and third lock members engage the first, second and third row of hooked fingers, respectively, and an unlocked position wherein all the lock members do not engage any of the hooked fingers, and a failsafe system for opening the electric switch via a breaker contained within the switch housing, the failsafe system comprising an arm having opposite first and second ends pivotally connected to the inside surface of the door, the arm being pivotally movable between first and second positions, the first end of the arm engaging the breaker to open the switch when the arm is in its first position, the first end of the arm engaging the breaker to close the switch when the arm is in its second position, the second end of the arm having a locking pin coupled thereto, said locking pin configured to lock one of the elongated lock members in said elongated member's locked position when the arm is in its first position and the locking pin is placed in a locking state, said locking pin being further configured to release said elongated lock member and move the arm into its second position when the locking pin is placed into an unlocked state.

2. A door assembly as defined in claim 1 wherein the first, second and third elongated lock members each have a row of apertures, the apertures of the first, second and third elongated lock members being configured such that when said elongated lock members are in their unlocked positions, the apertures of the first, second and third elongated lock members are aligned with the apertures of the first, second and third row of apertures on the second, third and fourth sides of the door, respectively, the apertures on the elongated lock members being further configured such that said apertures are brought out of alignment when the elongated lock members are moved towards their locked positions.

3. A door assembly as defined in claim 2 wherein the plurality of link members comprises a first and a second L shaped link member, each L shaped link member having first and second arms joined at an apex, the first arm of the first link member being coupled to the first elongated lock member and the second arm of the first link member being coupled to the second elongated lock member, the first arm of the second link member being coupled to the second elongated lock member and the second arm of the second link member being coupled to the third elongated lock member, the apex portion of the first link member being pivotally coupled to the door adjacent a first corner of the door adjacent the second and third sides of the door, the apex portion of the second link member being pivotally coupled to the door adjacent a second corner of the door adjacent the third and fourth sides of the door.

4. A door assembly as defined in claim 3 wherein first and second arms of the first link member are pivotally coupled to the first and second elongated lock members by first and second link pins, respectively, the first link member being mounted to the inside surface of the door, said first and second link pins passing through first and second elongated slots formed in the door, the first and second arms of the second link members being pivotally coupled to the second and third elongated lock members by third and fourth link pins, the second link member being mounted to the inside surface of the door, said third and fourth link pins pass through third and fourth elongated slots formed in the door.

5. A door assembly as defined in claim 1 further comprising a handle coupled to one of the elongated lock members for moving said elongated lock member between its locked and unlocked position.

6. A door assembly for use with an electric switch contained within a switch housing, the door assembly comprising:
   a) A frame having first, second, third and fourth sides and a central opening, each side of the frame having a length;
   b) A door dimensioned and configured to close off the central opening, the door having first, second, third and fourth sides, the first side of the door being hinged to the first side of the frame, the door having an inside surface facing towards the opening and an outside surface facing away from the opening, each side of the door having a length;
   c) A lock mechanism for releasably locking the door when the door is in a closed position, the lock mechanism comprising first, second and third elongated movable lock members extending along the lengths of the second, third and fourth sides of the door, respectively, said first, second and third elongated movable lock members engaging corresponding first, second and third stationary lock members extending along the lengths of the second, third and fourth sides of the frame, respectively, the first, second and third movable lock members each being movable between a locked position wherein the movable lock member locks with its respective stationary lock member, and an unlocked position wherein the movable lock member disengages from is respective stationary lock member;
   d) The lock mechanism further comprising first and second link members movably mounted to the door, the first link member coupling the first and second movable lock members together and the second link member coupling the second and third movable lock members together, the link members and movable lock members being configured such that moving one of the movable lock members between its locked and unlocked positions causes the remaining movable lock arms to move between their locked and unlocked positions, and
   e) a handle mounted to the outside surface of the door, the handle being operatively coupled to one of the movable lock members to enable a user to move the movable lock member between its locked and unlocked position, and
   e) a failsafe system for opening the electric switch via a breaker contained within the switch housing, the failsafe system comprising an arm having opposite first and second ends pivotally connected to the inside surface of the door, the arm being pivotally movable between first and second positions, the first end of the arm engaging the breaker to open the switch when the arm is in its first position, the first end of the arm engaging the breaker to close the switch when the arm is in its second position, the second end of the arm having a locking pin coupled thereto, said locking pin configured to lock one of the movable lock members in said movable lock member's locked position when the arm is in its first position and the locking pin is placed in a locking state, said locking pin being further configured to release said movable lock member and move the arm into its second position when the locking pin is placed into an unlocked state.

7. A door assembly as defined in claim 6 wherein the first side of the door is hinged to the first side of the frame by an elongated piano hinge extending the length of the first side of the door and the first side of the frame.

8. A door assembly as defined in claim 7 wherein the piano hinge has a pin and steel flaps, the pin being at least about ⅜ inch in diameter and the steel flats being at least about ⅛ inch in thickness.

9. A door assembly as defined in claim 7 wherein the piano hinge has a pin mounted to a pair of steel flaps, one of the steel flaps being coupled the door and the other steel flap being coupled to the frame, the pin being approximately ⅜ inch in diameter and the steel flaps each being approximately at least ⅛ inch in thickness.

* * * * *